United States Patent
Jonsson

(10) Patent No.: US 7,856,065 B2
(45) Date of Patent: Dec. 21, 2010

(54) METHOD AND APPARATUS FOR CORRECTING IQ IMBALANCE IN AN OFDM RECEIVER

(75) Inventor: Elias Jonsson, Malmö (SE)

(73) Assignee: Telefonkaktiebolaget Lm Ericsson (publ), Stockholm (SE)

( * ) Notice: Subject to any disclaimer, the term of this patent is extended or adjusted under 35 U.S.C. 154(b) by 884 days.

(21) Appl. No.: 11/743,298

(22) Filed: May 2, 2007

(65) Prior Publication Data

US 2008/0273608 A1    Nov. 6, 2008

(51) Int. Cl.
*H04L 27/28* (2006.01)
(52) U.S. Cl. .................................... 375/260
(58) Field of Classification Search ............... 375/260, 375/346, 297, 350, 316, 326, 345; 455/324; 341/155
See application file for complete search history.

(56) References Cited

U.S. PATENT DOCUMENTS

| | | | |
|---|---|---|---|
| 5,963,592 | A | 10/1999 | Kim |
| 6,442,217 | B1 | 8/2002 | Cochran |
| 7,061,994 | B2 | 6/2006 | Li et al. |
| 7,158,586 | B2 | 1/2007 | Husted |
| 7,167,513 | B2 | 1/2007 | Tsui et al. |
| 7,313,203 | B2 * | 12/2007 | Tubbax et al. ............ 375/316 |
| 7,626,921 | B2 * | 12/2009 | Egashira et al. .......... 370/208 |
| 2003/0231726 | A1 | 12/2003 | Schuchert et al. |
| 2004/0203472 | A1 | 10/2004 | Chien |
| 2005/0152482 | A1 | 7/2005 | Tubbax et al. |
| 2006/0198475 | A1 * | 9/2006 | Wu et al. ................... 375/346 |
| 2007/0025474 | A1 * | 2/2007 | Moorti et al. ............. 375/329 |
| 2007/0286307 | A1 * | 12/2007 | Hayashi et al. ........... 375/297 |

FOREIGN PATENT DOCUMENTS

| | | |
|---|---|---|
| EP | 1624636 | 2/2006 |
| EP | 1739871 | 1/2007 |
| EP | 1742375 | 1/2007 |
| WO | 2006/067681 | 6/2006 |
| WO | 2006/090033 | 8/2006 |

OTHER PUBLICATIONS

Lin, Juang-Hao, et al. "Implementation of Digital IQ Imbalance Compensation in OFDM WLAN Receivers." Proceedings of IEEE International Symposium on Circuits and Systems 2006 (ISCAS '06), May 21-24, 2006, pp. 3534-3537.

(Continued)

*Primary Examiner*—Khai Tran
(74) *Attorney, Agent, or Firm*—Coats & Bennett, P.L.L.C.

(57) ABSTRACT

Methods and apparatus for processing received OFDM signals to compensate for distortions caused by IQ imbalances are disclosed. Receiver circuits may be configured to demodulate symbols from a first logical channel, using an uncompensated received OFDM signal that includes the effects of those distortions. Receiver circuits may be further configured to calculate an IQ imbalance parameter, using the demodulated symbols, for use in compensating the received OFDM signal to reduce the effects of the IQ imbalances. The compensated signal produced thereby may be used for demodulating symbols from a second logical channel, perhaps corresponding to a user data channel.

27 Claims, 2 Drawing Sheets

OTHER PUBLICATIONS

Tarighat, Alireza et al. "On the Baseband Compensation of IQ Imbalances in OFDM Systems." Proceedings of the IEEE International Conference on Acoustics, Speech, and Signal Processing 2004 (ICASSP '04), May 17-21, 2004, vol. 4, pp. 1021-1024.

Tubbax, Jan et al. "Compensation of IQ Imbalance and Phase Noise in OFDM Systems." IEEE Transactions on Wireless Communications, May 2005, vol. 2, pp. 872-877.

Tarighat, A. et al. "Compensation Schemes and Performance Analysis of IQ Imbalances in OFDM Receivers." IEEE Transactions on Siganl Processing, vol. 53, No. 8, Aug. 2005, pp. 3257-3268.

Tarighat, A. et al. "MIMO OFDM Receivers for Systems with IQ Imbalances." IEEE Transactions on Signal Processing, vol. 53, No. 9, Sep. 2005, pp. 3583-3596.

* cited by examiner

METHOD AND APPARATUS FOR CORRECTING IQ IMBALANCE IN AN OFDM RECEIVER

BACKGROUND

1. Technical Field

The present invention generally relates to methods and apparatus for processing received Orthogonal Frequency Division Multiplexing (OFDM) signals, and particularly relates to compensating for IQ imbalances in such signal processing.

2. Background

A typical wireless communications receiver includes a downconverter stage to translate the radio frequency carrier signal to an intermediate frequency (IF) signal and/or to baseband. Some receivers utilize direct down-conversion to a baseband signal (a so-called zero-IF signal). Many OFDM-based receivers in particular are expected to use direct-conversion zero-IF receivers.

Modern receivers typically implement complex down-conversion, whereby an input radio frequency signal is split and multiplied by a local oscillator and a quadrature version of the local oscillator. In effect, in one branch of the receiver the input signal is multiplied by a cosine waveform at the local oscillator frequency, while in the other branch the input signal is multiplied by a sine waveform at the local oscillator frequency. The resulting outputs are known as the in-phase (I) and quadrature (Q) components.

Imperfections in the analog components of the downconverter can result in imbalances between the two branches, with respect to the relative amplitudes, relative phases, or both. These IQ imbalances can in some cases have significant impact on the performance of a wireless receiver; the impact becoming more acute as higher-order modulation schemes are employed. This is particularly true in the direct-conversion zero-IF receivers contemplated for many future OFDM applications.

Previous attempts to correct for these imbalances have relied on adaptive statistical estimation techniques, wherein a reference signal is constructed, using estimates of the effects of the IQ imbalance, and compared to the actual received signal to generate an error signal. The error signal is adaptively minimized to refine the estimates of the statistics relating to the IQ imbalance. See, for example, U.S. Patent Application Publication US 2006/0029150. This approach is computationally complex, however, and may not be robust enough for all situations. For example, convergence rates may be unacceptably slow.

SUMMARY

Novel methods and apparatus for processing received OFDM signals to compensate for distortions caused by IQ imbalances are disclosed, wherein a compensation parameter is directly calculated using known symbols, demodulated from a first logical channel, and samples of the uncompensated received OFDM signal corresponding to those known symbols. The compensation parameter is used to generate a compensated signal, from which a second logical channel is demodulated. By selecting a first logical channel that can be reliably demodulated despite the presence of IQ imbalances, a compensated signal is obtained from which the second logical channel can be reliably demodulated, even where reliable demodulation of the second channel from the uncompensated received signal is impossible. The compensation may be performed without the use of complex, adaptive parameter estimation techniques.

In an embodiment of the invention, a receiver circuit may be configured to demodulate symbols from a first logical channel contained in an uncompensated received OFDM signal that includes the effects of those distortions. The receiver circuit may be further configured to calculate an IQ imbalance parameter, using the demodulated symbols, for use in compensating the received OFDM signal to reduce the effects of the IQ imbalances. The compensated digital signal produced thereby may be used for demodulating symbols from a second logical channel, which may be a user data channel modulated onto one or more OFDM subcarriers using a higher-order modulation than employed for the first logical channel.

In one or more embodiments, the receiver circuit processes a received OFDM signal produced by a direct-conversion zero-IF downconverter. In one or more embodiments, the receiver is a multi-branch receiver receiving OFDM signals transmitted from one or more transmit antennas at one or more receive antennas, so that the received OFDM signal processed by the receiver circuit contains components corresponding to each branch.

In one or more embodiments, the first logical channel is modulated onto the OFDM signal using a lower-order modulation scheme, so that the first logical channel may be demodulated from an uncompensated digital signal. In various embodiments, the first logical channel may be a synchronization channel or a broadcast control channel. In various embodiments, the second logical channel may be modulated onto the OFDM signal using a higher-order modulation scheme, to achieve a high data rate. In such scenarios, the first logical channel, using a lower-order modulation, may be relatively insensitive to the IQ imbalances compared to the second logical channel. Thus, the first logical channel may be demodulated even in the presence of IQ imbalances, i.e. from an uncompensated received signal, while the second logical channel might only be recoverable from a compensated signal.

The above receiver-based processing may be implemented in a receiver including one or more appropriately configured processing circuits, which may comprise hardware, software, or any mix thereof. For example, a special or general-purpose microprocessor or digital signal processor may be configured to execute computer program instructions carrying out the above methods, or variations thereof.

Of course, the present invention is not limited to the above contexts, nor is it limited to the above features and advantages. Indeed, those skilled in the art will recognize additional features and advantages upon reading the following detailed description, and upon viewing the accompanying drawings.

DETAILED DESCRIPTION

Figure 1:
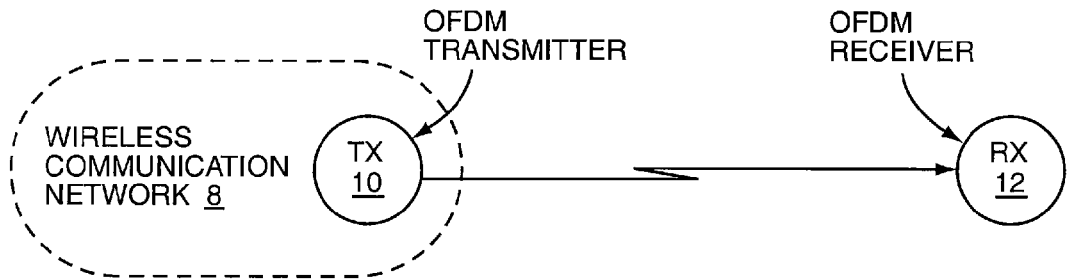
FIG. 1 is a block diagram of a wireless communications network.

FIG. 1 partially illustrates a wireless communication network 8 that includes at least one transmitter 10 for transmitting data, which may include control data, voice data, or other user data, to a remote receiver 12, using an Orthogonal Frequency Division Multiplexing (OFDM) signal. Receiver 12 comprises one or more circuits configured according to an embodiment of the present invention to receive the transmitted signals, compensate for IQ imbalances calculated during the receiving process, and to demodulate the (compensated) signals to recover the transmitted data.

For the receiver 12, and indeed in most practical OFDM receivers, imperfections in the analog components of its IQ downconverter can result in imbalances between the in-phase (I) and quadrature (Q) branches, with respect to the relative amplitudes, relative phases, or both. A model of the uncompensated received OFDM signal, including IQ-imbalances, is given by $$\tilde{y}_i(n) = \mu_i y_i(n) + v_i(y_i(n))^*, \quad \text{Eq. (1)}$$

where $y_i(n)$ is the undistorted received signal for sample n and receive antenna i.

Unless the context indicates otherwise, the term "received OFDM signal" is used in this disclosure to refer to a downconverted (i.e. intermediate-frequency or baseband), digitized signal. The analysis presented herein readily applies to a diversity system with $N_{TX}$ transmit antennas and $N_{RX}$ receive antennas, e.g. a Multiple-input, Multiple-Output, or MIMO, system. For a multi-branch receiver, the IQ imbalance may vary for each branch. Accordingly, many of the expressions herein may include terms corresponding to the j-th transmit antenna and/or the i-th receive antenna. Appropriately simplified, the analysis here is also applicable to systems employing only one transmit antenna and/or only one receive antenna; those skilled in the art will readily recognize the appropriate simplifications.

With respect to mathematical terminology used in this disclosure, note that if x is a complex variable, then x* refers to its complex conjugate. For a vector x, $x^t$ denotes its transpose, and $x^H$ denotes its Hermitian transpose. Finally, for discrete time sequence x(n), its discrete Fourier transform is denoted by X(k). These conventions will be used throughout this disclosure.

The distortion parameters $\mu_i$ and $v_i$ in Equation 1 are related to the amplitude and phase imbalances between the I and Q branches in the analog RF-parts. If the phase imbalance introduced by the receiver is denoted as $\theta_i$, and the amplitude imbalance as $\alpha_i$, then the relationship between $\mu_i$, $v_i$ and $\theta_i$, $\alpha_i$ is given by:

$$\mu_i = \cos(\theta_i/2) + i\alpha_i \sin(\theta_i/2),$$

$$v_i = \alpha_i \cos(\theta_i/2) + i \sin(\theta_i/2).$$

No IQ-imbalances are present when $\theta_i$ equals zero and $\alpha_i$ equals zero. The parameters $\mu_i$ and $v_i$ are complex numbers, which are assumed constant over the frequency bandwidth. However, as noted above, IQ imbalances may vary from one receiver branch to another, so an accurate model of the distorted signal may require individual $\mu_i$ and $v_i$ parameters for each receive antenna branch.

For analytical purposes, assume that $\mu_i$ and $v_i$ are known, and define a new signal $\bar{y}_i(n)$:

$$\bar{y}_i(n) = \tilde{y}_i(n) - \left(\frac{v_i}{\mu_i^*}\right)(\tilde{y}_i(n))^* \quad \text{Eq. (2)}$$

Substituting equation (1) into (2):

$$\begin{aligned}\bar{y}_i(n) &= \tilde{y}_i(n) - \left(\frac{v_i}{\mu_i^*}\right)(\tilde{y}_i(n))^* \\ &= \mu_i y_i(n) + v_i(y_i(n))^* - v_i(y_i(n))^* - \left(\frac{|v_i|^2}{\mu_i^*}\right)y_i(n) \\ &= \left(\mu_i - \frac{|v_i|^2}{\mu_i^*}\right)y_i(n) \\ &= \mu_i\left(1 - \left|\frac{v_i}{\mu_i}\right|^2\right)y_i(n).\end{aligned}$$

That is, a linear combination of the signal $\tilde{y}_i(n)$, resulting in the signal $\bar{y}_i(n)$, yields a signal proportional to the undistorted received signal $y_i(n)$. Reviewing equation (2), it is apparent that only a single parameter, namely $v_i/\mu_i^*$, is needed in order to create a scaled version of the original, undistorted signal, from the unbalanced signal $\tilde{y}_i(n)$.

Figure 2:
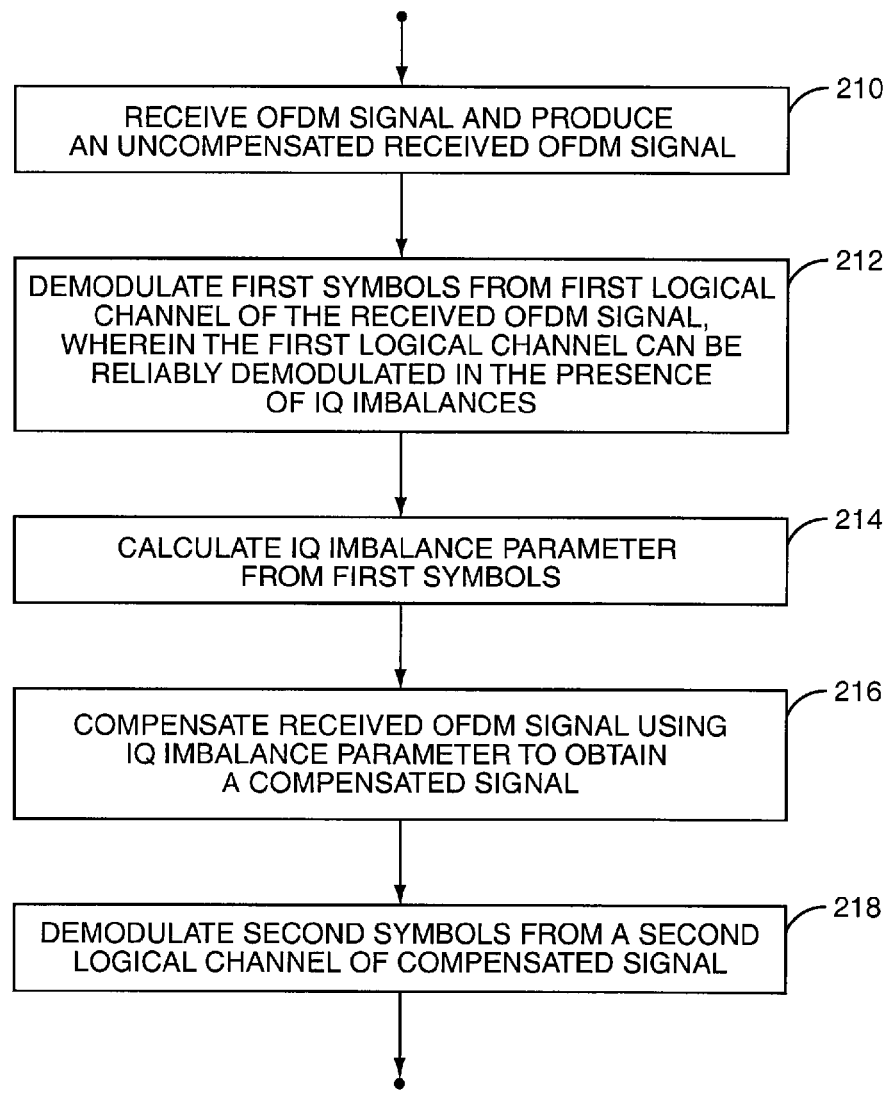
FIG. 2 illustrates a flowchart of IQ imbalance compensation processing in accordance with one or more embodiments of the present invention.

Referring to FIG. 2, block 210 illustrates the reception of an OFDM signal and the production of an uncompensated, received OFDM signal therefrom. This received OFDM signal corresponds to the unbalanced signal $\tilde{y}_i(n)$ in the preceding discussion.

Block 216 of FIG. 2 illustrates the compensation of the received OFDM signal, using the IQ imbalance parameter, to provide a compensated signal, corresponding to $\bar{y}_i(n)$ in the preceding analysis. The IQ imbalance parameter of block 216 corresponds to a directly calculated estimate of the parameter $v_i/\mu_i^*$ discussed above. As demonstrated above, with an estimate of the parameter $v_i/\mu_i^*$ a new signal can be calculated that approximates the undistorted signal, except scaled by a constant.

That new signal corresponds to the compensated signal produced by block 216. The following analysis explains how an estimate for $v_i/\mu_i^*$ may be calculated, in accordance with block 214 of FIG. 2.

If x(n) is a discrete time sequence of length N, then the discrete Fourier transform (DFT) of the conjugate sequence $(x(n))^*$ is, where in the second equality $w^{Nn}=1$:

$$\begin{aligned}\frac{1}{N}\sum_{n=0}^{N-1}(x(n))^* w^{-kn} &= \frac{1}{N}\left(\sum_{n=0}^{N-1}x(n)w^{kn}\right)^* \\ &= \frac{1}{N}\left(\sum_{n=0}^{N-1}x(n)w^{kn}w^{-Nn}\right)^* \\ &= \frac{1}{N}\left(\sum_{n=0}^{N-1}x(n)w^{-(N-k)n}\right)^* \\ &= \begin{cases}(X(0))^*, & k=0, \\ (X(N-k))^*, & k=1,\ldots,N-1,\end{cases} \\ &= (X^{shift}(k))^*\end{aligned}$$

Here $X^{shift}(k)$ is defined as:

$$X^{shift}(k) = \begin{cases} X(k), & k = 0, \\ X(N-k), & k = 1, \ldots, N-1 \end{cases}$$

and $$w = e^{j2\pi/N}.$$

Using this definition for the function $X^{shift}(k)$, then the DFT of equation (1) is given by:

$$\tilde{Y}_i(k) = \mu_i Y_i(k) + \nu_i (Y_i^{shift}(k))^*. \quad \text{Eq. (3)}$$

This represents a frequency-domain model for the received OFDM signal, including distortions caused by IQ imbalance.

The received signal without IQ imbalance distortions may be represented in the frequency domain, that is, after the FFT, as:

$$Y_i(k) = \sum_{j=1}^{N_{TX}} H_{i,j}(k, n_{sym}) S(k) + \hat{\eta}_i(k), \quad \text{Eq. (4)}$$

where all transmit antennas are sending the same symbols. Here $\hat{\eta}_i(k)$ is the inter-cell interference for tone (sub-carrier) k and receive antenna i, and $H_{i,j}(k,n)$ is the time-varying frequency response of the propagation channel, where k indexes the frequency tone and n the time. (Note that $H_{i,j}(k,n)$ is derived from the impulse responses of the downlink propagation channels given by $h_{i,j}(l,n)$ at time t=nT. l indexes the various taps in the impulse response and T is the sampling period for the digital baseband signal.)

Equation (4) neglects any frequency errors. This is appropriate if it is assumed that frequency errors (differences between the carrier frequency and the local oscillator frequencies) have been reduced to a negligible amount by automatic frequency control (AFC). Various AFC techniques are known to those skilled in the art.

From equation (4) it follows immediately that $$Y_i^{shift}(k) = \sum_{j=1}^{N_{TX}} H_{i,j}^{shift}(k, n_{sym}) S^{shift}(k) + \hat{\eta}_i^{shift}(k). \quad \text{Eq. (5)}$$

Inserting equation (4) and (5) into equation (3) yields $$\tilde{Y}_i(k) = \tilde{H}_i(k, n_{sym}) S(k) + \rho_i (\tilde{H}_i^{shift}(k, n_{sym}) S^{shift}(k))^* + \tilde{\eta}_i(k), \quad \text{Eq. (6)}$$

where the expression is simplified by using $$\tilde{H}_i(k, n_{sym}) = \mu_i \sum_{j=1}^{N_{TX}} H_{i,j}(k, n_{sym}),$$

$$\rho_i = \nu_i / \mu_i, \text{ and}$$

$$\tilde{\eta}_i(k) = \mu_i \hat{\eta}_i(k) + \nu_i (\hat{\eta}_i^{shift}(k))^*.$$

Recalling the definition of $X^{shift}(k)$, then for $k=1, \ldots, N-1$:

$$\tilde{Y}_i(k) = \tilde{H}_i(k, n_{sym}) S(k) + \rho_i (\tilde{H}_i(N-k, n_{sym}) S(N-k))^* + \tilde{\eta}_i(k). \quad \text{Eq. (7)}$$

Since $\mu_i$ is a complex number scaling the propagation channel $H_{i,j}(k, n_{sym})$, a conventional channel estimation block will in fact estimate $\mu_i H_{i,j}(k, n_{sym})$. The estimated propagation channel characteristics $\tilde{H}_i(k, n_{sym})$ may be denoted $\tilde{H}_i^{PCE}(k, n_{sym})$.

It can be shown that the IQ imbalance parameter $\rho_i$ may be estimated directly by solving:

$$\min_{\rho_i} \sum_{k=1}^{N-1} |\tilde{Y}_i(k) - (\tilde{H}_i^{PcE}(k, n_{sym}) S(k) + \rho_i (\tilde{H}_i^{PcE}(N-k, n_{sym}) S(N-k))^*)|^2. \quad \text{Eq. (8)}$$

The solution to equation (8) is:

$$\rho_i = \frac{\sum_{k=1}^{N-1} \tilde{H}_i^{PcE}(N-k, n_{sym}) S(N-k) (\tilde{Y}_i(k) - \tilde{H}_i^{PcE}(k, n_{sym}) S(k))}{\sum_{k=1}^{N-1} |\tilde{H}_i^{PcE}(k, n_{sym}) S(k)|^2}. \quad \text{Eq. (9)}$$

Accordingly, to calculate an estimate for the IQ imbalance parameter $\rho_i$, then propagation channel estimates and a set of known symbols $S(k)$ corresponding to the uncompensated received signal $\tilde{Y}_i(k)$ are required. As will be shown below, a set of known symbols $S(k)$ can be recovered from certain channels, even in the presence of IQ imbalances.

Referring again to FIG. 2, block 212 illustrates the demodulating of a set of known symbols ("first symbols") from a first logical channel of the received OFDM signal. This is done under circumstances where the first logical channel can be reliably demodulated from the received OFDM signal, despite the presence of IQ imbalance. A first logical channel might be reliably demodulated, even where a second logical channel is not, because, for instance, the first logical channel has been modulated on OFDM subcarriers using a lower-order modulation scheme than employed for the second logical channel. These demodulated symbols recovered from the first logical channel may be used for the symbols $S(k)$ required in Equation 9.

An exemplary embodiment of the present invention might use a received synchronization channel (SCH) or broadcast-control channel (BCH) as a source of reference symbols $S(k)$. In an exemplary network, one or both of these logical channels may be multiplexed onto the OFDM carrier in such a manner that some of the subcarrier tones are designated to the SCH and/or BCH. User data may be allocated to remaining subcarriers.

One or more logical channels may be multiplexed onto the OFDM carrier using a lower-order modulation scheme than used for another logical channel. This may be done in order to facilitate initial acquisition of a channel by a receiver. Another channel, such as a user data channel, may be modulated onto the OFDM carrier using a higher-order modulation scheme, in order to maximize the user data rate. For example, one logical channel may be multiplexed onto several subcarrier tones using QPSK modulation. (Since QPSK has four samples per baud, it has an order of four.) A user data channel, on the other hand, might use several subcarriers modulated using a higher-order quadrature amplitude modulation (QAM) scheme, such as 64-QAM (with an order of 64).

As a result, one logical channel, such as the SCH or BCH, may often be reliably demodulated without compensating for IQ imbalances, while other logical channels, such as a user data channel, may not. Accordingly, in an embodiment of the present invention, first symbols from a first logical channel in the received OFDM signal are demodulated, wherein this first logical channel can be reliably demodulated despite the presence of IQ imbalances. This step corresponds to block 212 of FIG. 2.

Close examination of Equation 9 reveals that for each symbol S(k) that is used to calculate the IQ imbalance parameter, where k indexes the subcarrier from which S(k) is demodulated, a corresponding symbol S(N−k) is also required. Thus, symbols corresponding to mirrored tones are selected to solve Equation 9 and calculate the IQ imbalance parameter.

Block 214 illustrates the calculation of an IQ imbalance parameter, using the demodulated symbols from the first logical channel. In the analysis above, equations are given to demonstrate the calculation of an IQ imbalance parameter using the demodulated symbols and estimates of the propagation channel characteristics. Techniques for estimating propagation channel characteristics will be well known to those skilled in the art. As seen in the analysis above, an IQ imbalance parameter may be determined for a single-branch receiver, or for each branch in a multi-branch receiver. Although in general the IQ imbalances will differ from branch to branch in a multi-branch receiver, under some circumstances the calculation of IQ imbalance parameters may be simplified by assuming that the IQ imbalance is constant from one branch to another.

It may be desirable in some embodiments of the present invention to smooth the estimated IQ imbalance parameter over time. Hence, an embodiment may repeat the calculation of $\rho_i$ at different symbol times, and filter the results of these calculations to obtain an IQ imbalance parameter. A variety of filtering techniques are contemplated herein.

After an IQ imbalance parameter is calculated, as depicted by block 214, the IQ imbalance parameter is used to compensate the received digital signal, as shown in block 216. As demonstrated above, the IQ imbalance parameter can be applied to the uncompensated signal to produce a compensated signal that approximates a scaled version of the ideal, undistorted signal. Thus, effects of the IQ imbalances may be reduced. A demodulator may then process the compensated signal to demodulate one or more additional channels, such as a user data channel, as depicted in block 218. In this manner, channels that could not be reliably demodulated in the presence of IQ imbalances, such as channels modulated with a high-order modulation, may be reliably demodulated.

Because the calculation of IQ imbalances requires the demodulation of symbols from a first logical channel, there will generally be a slight delay before the IQ-imbalance can be calculated and applied to produce a compensated digital signal. This delay need not be materially harmful. In an exemplary receiver the IQ imbalance parameters may be estimated after completion of cell-search, channel estimation, and automatic frequency compensation. In certain embodiments, the received OFDM signal may be buffered, so that the buffered data may be compensated after the IQ imbalance parameter is calculated.

Figure 3:
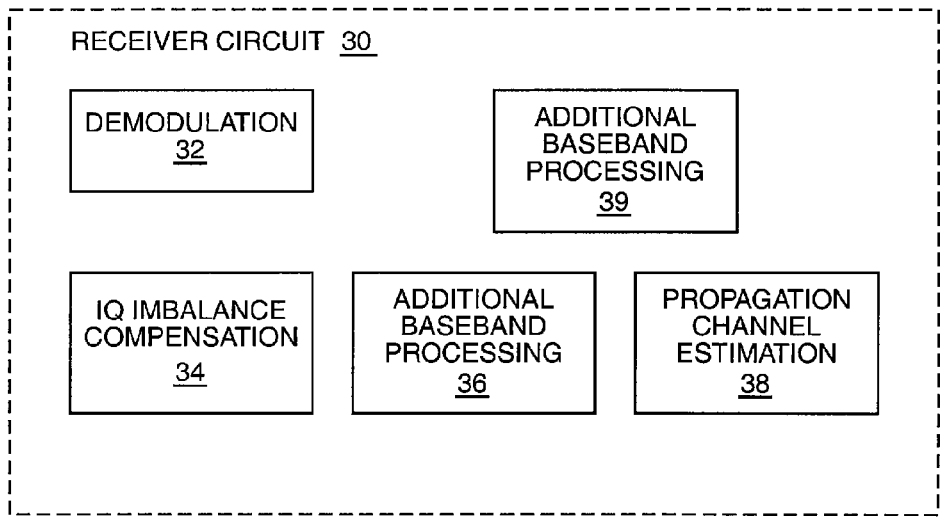
FIG. 3 is a block diagram illustrating functional blocks of one embodiment of a circuit configured for IQ imbalance compensation.

The methods disclosed herein may be implemented by a receiver circuit, as depicted in FIG. 3, which may comprise one or more processing circuits. In the illustrated embodiment, receiver circuit 30 comprises processing circuits configured to demodulate first symbols from a first logical channel of a received OFDM signal; to calculate an IQ imbalance parameter using the first symbols as known symbols; to compensated the received OFDM signal using the IQ imbalance parameter to obtain a compensated signal; and to demodulate second symbols from a second logical channel of the compensated signal.

Accordingly, receiver circuit 30, as illustrated in FIG. 3, includes a demodulation circuit 32, which is configured to demodulate symbols from a first logical channel in a received OFDM signal, even in the presence of IQ imbalances. This first logical channel, as discussed above, may be, for example, a broadcast control channel or a synchronization channel. The same demodulation circuit 32 may further be configured to demodulate symbols from a second logical channel, using a compensated signal, i.e. a signal where the effects of the IQ imbalances have been mitigated. As explained above, the modulation schemes employed to modulate the first logical channel may differ from those employed to modulate the second logical channel. The demodulation circuit 32 may comprise multiple circuits to handle differing modulation schemes, but is advantageously implemented with a signal digital signal processing circuit.

The demodulation circuit 32 may further be configured to interface with buffer circuits (not shown), so that received signals may be temporarily stored prior to demodulation. As explained above, these buffer circuits may optionally be used to store uncompensated signal samples while an IQ imbalance is being calculated, for subsequent compensation.

In the receiver circuit 30 illustrated in FIG. 3, IQ imbalance compensation is carried out in IQ imbalance compensation circuit 34, using the IQ imbalance parameter calculated by imbalance parameter calculation circuit 36. As the analysis above indicates, IQ imbalance compensation circuit 34 may apply the IQ imbalance parameter to the received OFDM signal to generate a compensated signal that approximates a scaled replica of the received signal without IQ imbalance distortions. Again as indicated by the preceding analysis, imbalance parameter calculation circuit 36 may use a set of known demodulated symbols S(k) to calculate an IQ imbalance parameter for use in compensation. Imbalance parameter calculation circuit 36 may also use estimates of the propagation channels, which are estimated in propagation channel estimation circuit 38 using techniques that are well known to those skilled in the art.

Receiver circuit 30 may also include an additional baseband processing circuit 39, which may provide functions such as supervising the previously discussed circuits, managing memory, interfacing with other operating circuitry, performing higher level communications functions, etc. As will be readily understood, receiver circuit 30 may be implemented using digital and/or analog hardware, microprocessors running software, or a combination. Receiver circuit 30 may comprise specialized or general-purpose processors, or digital signal processors (DSP) or one or more of each.

Figure 4:
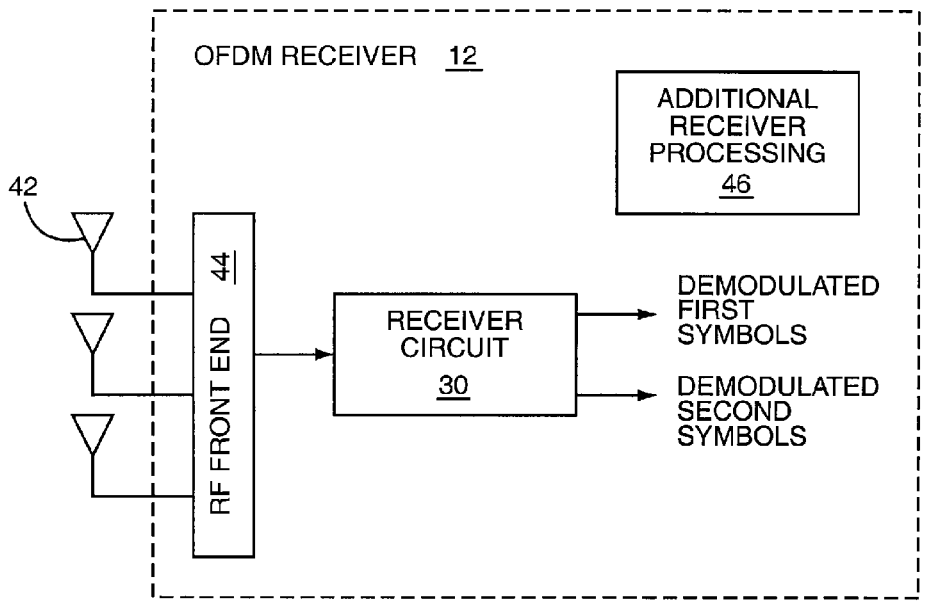
FIG. 4 illustrates an embodiment of an OFDM receiver that includes the receiver circuit of FIG. 3.

FIG. 4 illustrates details of one embodiment of the OFDM receiver of FIG. 1, including receiver circuit 30. In this embodiment, OFDM receiver 12 is connected to several antennas 42, which feed an RF front end 44. The RF front end may comprise switches, filters, amplifiers, and other analog circuitry for conditioning the radio frequency signals received on antennas 42. The RF front end 44 may further comprise mixers, local oscillators, and analog-to-digital (A/D) converters, to supply a downconverted, digitized, received OFDM signal to receive circuit 30. As discussed above, imperfections in the analog components of the RF front end 44 may introduce IQ imbalances, so that the signal provided to receiver circuit 30 contains distortions from IQ imbalance. OFDM receiver 12 may also include additional receiver processing, which may, for example, control the receiver circuit 30 and RF front end 44.

OFDM receiver 12 may be combined with transmitter circuitry to provide a complete OFDM transceiver device. This transceiver device may be configured as a portable, end-user terminal, such as a cellular radiotelephone, or as a fixed communications device.

With these and other variations and extensions in mind, those skilled in the art will appreciate that the foregoing description and the accompanying drawings represent non-limiting examples of the methods and apparatus taught herein for processing a received OFDM signal. As such, the present invention is not limited by the foregoing description and accompanying drawings. Instead, the present invention is limited only by the following claims and their legal equivalents.

What is claimed is:

1. A method for processing a received OFDM signal having undesired IQ imbalances, comprising:
   demodulating first symbols from a first logical channel of the received OFDM signal, wherein said first logical channel can be reliably demodulated in the presence of IQ imbalances;
   calculating an IQ imbalance parameter using the first symbols;
   compensating the received OFDM signal using the IQ imbalance parameter to obtain a compensated signal; and
   demodulating second symbols from a second logical channel of the compensated signal.

2. The method of claim 1, wherein the received OFDM signal is a zero-frequency baseband signal.

3. The method of claim 1, wherein demodulating first signals from a first logical channel of the received OFDM signal comprises demodulating one or more mirrored subcarrier pairs corresponding to the first logical channel to obtain the first symbols.

4. The method of claim 3, wherein the one or more mirrored subcarrier pairs are modulated using a relatively low-order modulation scheme, such that the symbols can be reliably demodulated from the received OFDM signal in the presence of IQ imbalances.

5. The method of claim 4, wherein the first logical channel comprises a synchronization channel.

6. The method of claim 4, wherein the first logical channel comprises a broadcast control channel.

7. The method of claim 1, wherein the first logical channel comprises a synchronization or broadcast control channel.

8. The method of claim 5, wherein the second logical channel comprises one or more subcarriers modulated using a relatively high-order modulation scheme.

9. The method of claim 6, wherein the second logical channel comprises one or more subcarriers modulated using a relatively high-order modulation scheme.

10. The method of claim 1, wherein the first logical channel comprises a first sequence of symbols modulating subcarriers using a modulation scheme of order n and wherein the second logical channel comprises a second sequence of symbols modulating subcarriers using a modulation scheme of order greater than n.

11. The method of claim 1, wherein calculating an IQ imbalance parameter using the first symbols comprises directly calculating the IQ imbalance parameter as a function of selected first symbols corresponding to one or more mirrored subcarrier pairs and samples of the received OFDM signal corresponding to the selected first symbols.

12. The method of claim 11, wherein calculating an IQ imbalance parameter using the first symbols further comprises directly calculating the IQ imbalance parameter as a function of propagation channel estimates corresponding to the one or more mirrored subcarrier pairs.

13. The method of claim 11, wherein calculating an IQ imbalance parameter using the first symbols further comprises calculating a succession of IQ imbalance estimates as a function of selected first symbols corresponding to one or more subcarrier pairs and samples of the received OFDM signal corresponding to the selected first symbols, and filtering the estimates to provide the IQ imbalance parameter.

14. The method of claim 1, wherein compensating the received OFDM signal comprises calculating a linear combination of the received OFDM signal and a complex conjugate of the received OFDM signal, using the IQ imbalance parameter, to generate the compensated signal.

15. The method of claim 1, wherein the received OFDM signal comprises digital signals associated with each of a plurality of receive antennas.

16. A receiver circuit for processing a received OFDM signal having undesired IQ imbalances, the receiver circuit comprising one or more processing circuits configured to:
    demodulate first symbols from a first logical channel of the received OFDM signal, wherein said first logical channel can be reliably demodulated in the presence of IQ imbalances;
    calculate an IQ imbalance parameter using the first symbols; and
    compensate the received OFDM signal using the IQ imbalance parameter to generate a compensated signal; and
    demodulate second symbols from a second logical channel of the compensated signal.

17. The receiver circuit of claim 16, wherein the one or more processing circuits comprise a demodulator circuit configured to demodulate first symbols from a first logical channel of the received OFDM signal by demodulating one or more mirrored subcarrier pairs corresponding to the first logical channel.

18. The receiver circuit of claim 17, wherein the one or more mirrored subcarrier pairs are modulated using a relatively low-order modulation scheme, so that the symbols can be reliably demodulated from the received OFDM signal in the presence of IQ imbalances.

19. The receiver circuit of claim 18, wherein the demodulator circuit is further configured to demodulate a second logical channel of the compensated signal, wherein the second logical channel comprises one or more subcarriers modulated using a relatively high-order modulation scheme.

20. The receiver circuit of claim 16, wherein the one or more processing circuits comprise an IQ imbalance parameter calculator configured to directly calculate the IQ imbalance parameter as a function of selected first symbols corresponding to one or more mirrored subcarrier pairs and samples of the received OFDM signal corresponding to the selected first symbols.

21. The receiver circuit of claim 20, wherein the imbalance parameter calculator is further configured to directly calculate the IQ imbalance parameter as a function of propagation channel estimates corresponding to the one or more mirrored subcarrier pairs.

22. The receiver circuit of claim 20, wherein the imbalance parameter calculator is configured to calculate a succession of IQ imbalance estimates as a function of selected first symbols corresponding to one or more mirrored subcarrier pairs and samples of the received OFDM signal corresponding to the selected first symbols, and is further configured to filter the estimates to provide an IQ imbalance parameter.

23. The receiver circuit of claim 16, wherein the compensator is configured to compensate the received OFDM signal by calculating a linear combination of the received OFDM signal and a complex conjugate of the received OFDM signal, using the IQ imbalance parameter, to generate the compensated signal.

24. The receiver circuit of claim 16, wherein the received OFDM signal comprises digital signals corresponding to each of a plurality of receive antennas.

25. The receiver circuit of claim 24, wherein the IQ imbalance parameter comprises terms corresponding to each of the plurality of receive antennas.

26. A wireless device for receiving OFDM signals including the receiver circuit of claim 16.

27. A wireless device for receiving OFDM signals including the receiver circuit of claim 16 and further comprising:
   one or more antennas; and
   a front-end circuit connected to the one or more antennas and including at least one analog-to-digital converter, configured to down-convert radio frequency OFDM signals received at the one or more antennas and convert the down-converted signals to generate a received OFDM signal having undesired IQ imbalances.

* * * * *

UNITED STATES PATENT AND TRADEMARK OFFICE
CERTIFICATE OF CORRECTION

PATENT NO. : 7,856,065 B2
APPLICATION NO. : 11/743298
DATED : December 21, 2010
INVENTOR(S) : Jonsson It is certified that error appears in the above-identified patent and that said Letters Patent is hereby corrected as shown below:

Title Pg, Item (73), under "Assignee", in Column 1, Line 1, delete "Telefonaktiebolaget Lm" and insert -- Telefonaktiebolaget LM -- therefor.

Title Pg, Item (56), under "OTHER PUBLICATIONS", in Column 2, Line 3, delete "Siganl" and insert -- Signal -- therefor.

In Column 3, Line 22, delete "Multiple-input" and insert -- Multiple Input -- therefor.

In Column 4, Line 40, delete " $v_i \mu_i^*$ " and insert -- $v_i / \mu_i^*$ -- therefor.

In Column 5, Line 51, in Equation (6), delete " $\tilde{\eta}_i(k),$ " and insert -- $\widetilde{\eta}_i(k),$ -- therefor.

In Column 5, Line 64, in Equation (7), delete " $\tilde{\eta}_i(k).$ " and insert -- $\widetilde{\eta}_i(k).$ -- therefor.

Signed and Sealed this
Twenty-third Day of August, 2011

David J. Kappos
*Director of the United States Patent and Trademark Office*